United States Patent
LeMay et al.

(10) Patent No.: US 10,007,784 B2
(45) Date of Patent: Jun. 26, 2018

(54) TECHNOLOGIES FOR CONTROL FLOW EXPLOIT MITIGATION USING PROCESSOR TRACE

(71) Applicant: Intel Corporation, Santa Clara, CA (US)

(72) Inventors: Michael LeMay, Hillsboro, OR (US); Ravi L. Sahita, Beaverton, OR (US); Beeman C. Strong, Portland, OR (US); Thilo Schmitt, Biberach/Riβ (DE); Yuriy Bulygin, Beaverton, OR (US); Markus T. Metzger, Ulm (DE)

(73) Assignee: Intel Corporation, Santa Clara, CA (US)

(*) Notice: Subject to any disclaimer, the term of this patent is extended or adjusted under 35 U.S.C. 154(b) by 125 days.

(21) Appl. No.: 14/670,988

(22) Filed: Mar. 27, 2015

(65) Prior Publication Data
US 2016/0283714 A1    Sep. 29, 2016

(51) Int. Cl.
*G06F 21/56* (2013.01)
*G06F 21/44* (2013.01)
*G06F 21/52* (2013.01)

(52) U.S. Cl.
CPC .............. *G06F 21/56* (2013.01); *G06F 21/44* (2013.01); *G06F 21/52* (2013.01)

(58) Field of Classification Search
None
See application file for complete search history.

(56) References Cited

U.S. PATENT DOCUMENTS

| | | | | |
|---|---|---|---|---|
| 8,510,596 B1* | 8/2013 | Gupta | ................... | G06F 11/073 714/15 |
| 2003/0174427 A1* | 9/2003 | Hogan | ............. | G11B 20/00086 360/60 |
| 2004/0243814 A1* | 12/2004 | Nakano | ............ | G11B 20/00086 713/189 |
| 2005/0028002 A1* | 2/2005 | Christodorescu | ..... | G06F 21/562 726/3 |
| 2005/0044219 A1* | 2/2005 | Lewis | ...................... | G06F 21/71 709/225 |
| 2007/0240217 A1* | 10/2007 | Tuvell | ..................... | G06F 21/56 726/24 |

(Continued)

*Primary Examiner* — Catherine Thiaw
*Assistant Examiner* — Wayne An
(74) *Attorney, Agent, or Firm* — Barnes & Thornburg LLP

(57) ABSTRACT

Technologies for control flow exploit mitigation include a computing device having a processor with real-time instruction tracing support. During execution of a process, the processor generates trace data indicative of control flow of the process. The computing device analyzes the trace data to identify suspected control flow exploits. The computing device may use heuristic algorithms to identify return-oriented programming exploits. The computing device may maintain a shadow stack based on the trace data. The computing device may identify indirect branches to unauthorized addresses based on the trace data to identify jump-oriented programming exploits. The computing device may check the trace data whenever the process is preempted. The processor may detect mispredicted return instructions in real time and invoke a software handler in the process space of the process to verify and maintain the shadow stack. Other embodiments are described and claimed.

19 Claims, 8 Drawing Sheets

(56) References Cited

U.S. PATENT DOCUMENTS

| | | | |
|---|---|---|---|
| 2010/0011441 A1* | 1/2010 | Christodorescu | G06F 21/53 |
| | | | 726/24 |
| 2011/0145800 A1* | 6/2011 | Rao | G06F 11/323 |
| | | | 717/133 |
| 2012/0144492 A1* | 6/2012 | Griffin | G06F 21/56 |
| | | | 726/25 |
| 2015/0254308 A1* | 9/2015 | Scott | G06F 17/30345 |
| | | | 707/780 |

* cited by examiner

TECHNOLOGIES FOR CONTROL FLOW EXPLOIT MITIGATION USING PROCESSOR TRACE

BACKGROUND

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack. Jump-oriented programming (JOP) exploits are similar, but target gadgets that end with an indirect jump instruction rather than a return instruction.

Certain ROP exploits may be prevented by maintaining a "shadow stack" in parallel with the ordinary system stack (also called the "legacy stack"). The shadow stack maintains a copy of the legacy stack in memory inaccessible to ordinary software, and may be used to determine if the legacy stack has been tampered with by malware. The shadow stack may be implemented using binary instrumentation, which introduces a significant performance slowdown for some usages. Technologies for protecting from ROP exploits using a shadow stack are further described in U.S. patent application Ser. No. 14/498,075, filed on Sep. 26, 2014, now U.S. Pat. No. 9,501,637, and entitled Hardware Shadow Stack Support for Legacy Guests.

Other measures are available to help prevent ROP exploits. For example, "canary" values may be inserted near return addresses in the stack, and may be monitored for changes. As another example, "control transfer terminating instructions" may be inserted into binaries to specifically identify legitimate return targets. However such measures may require recompiling or otherwise modifying guest software. Additionally, certain processor architectures may provide a call stack that is inaccessible to certain software. For example, certain microcontrollers may maintain a call stack that is inaccessible to software. As another example, certain processor architectures may maintain call stack information in a separate memory region from other stack values such as automatic variables.

Certain JOP exploits may be prevented by tagging or otherwise identifying authorized target locations for indirect branch instructions. Technologies for protecting from JOP exploits using indirect branch target security are further described in U.S. patent application Ser. No. 14/570,507, filed on Dec. 15, 2014, published as U.S. Patent Application Pub. No. 2016/0170769 A1, and entitled Technologies for Indirect Branch Target Security.

Address space layout randomization (ASLR) is a security technique implemented by certain operating systems (e.g., Windows™, Linux™, and OS X®). ASLR may mitigate ROP and JOP exploits. However, separate memory disclosure attacks may be used by malware to bypass ASLR.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
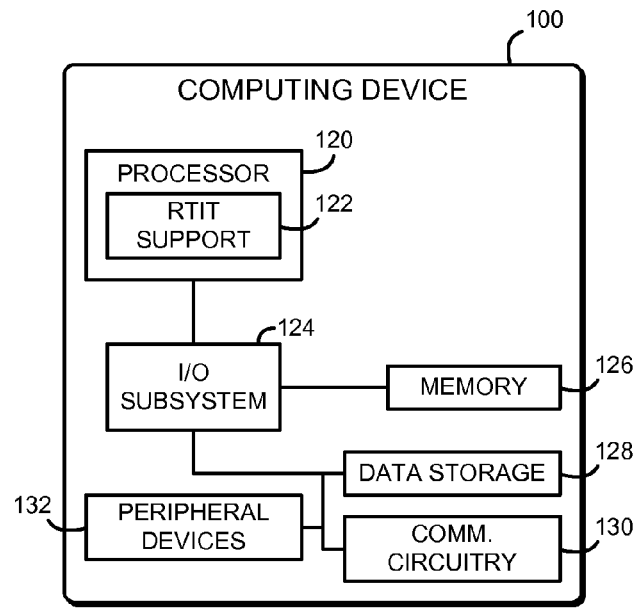
FIG. 1 is a simplified block diagram of at least one embodiment of a computing device for control flow exploit mitigation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for control flow exploit detection and mitigation includes a processor 120 having hardware real-time instruction tracing (RTIT) support. In use, as described below, the computing device 100 executes software with RTIT support enabled and the processor 120 automatically outputs trace data indicative of the control flow of the software. An exploit detector periodically analyzes the trace data to identify potential control flow exploits. For example, the exploit detector may apply one or more heuristic checks to the trace data to identify suspicious behavior, or may maintain a shadow stack based on the trace data that may be used to identify suspicious behavior. In some embodiments, the processor 120 may support real-time control flow exploit detection. The processor 120 may automatically output trace data indicative of the control flow of executing software and, in response to detecting mispredicted return instructions, invoke a mispredicted return handler. The mispredicted return handler may maintain a shadow stack based on the trace data that may be used to identify suspicious behavior. Thus, the computing device 100 may provide for efficient monitoring for control flow exploits (including both return-oriented programming and jump-oriented programming exploits) without modifying client software. The RTIT-based monitoring of the computing device 100 may be used to enable shadow stack monitoring and may be resistant to memory disclosure attacks.

The computing device 100 may be embodied as any type of device capable of real-time instruction tracing and otherwise performing the functions described herein. For example, the computing device 100 may be embodied as, without limitation, a computer, a desktop computer, a workstation, a server computer, a laptop computer, a notebook computer, a tablet computer, a smartphone, a mobile computing device, a wearable computing device, a distributed computing system, a multiprocessor system, a consumer electronic device, a smart appliance, and/or any other computing device capable of real-time instruction tracing. As shown in FIG. 1, the illustrative computing device 100 includes the processor 120, an I/O subsystem 124, a memory 126, and a data storage device 128. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 includes real-time instruction tracing (RTIT) support 122. The RTIT support 122 may be embodied as any hardware, microcode, firmware, or other components of the processor 120 capable of generating trace data that may be used to reconstruct the control flow executed by the processor 120. The RTIT support 122 may log data packets relating to whether conditional branches are taken or not taken, target addresses of indirect branch instructions, target addresses of mispredicted return instructions, and other data related to control flow. The trace data, in combination with the in-memory image of the executed application, may be used to reconstruct the control flow executed by the processor 120. For example, the RTIT support 122 may log the return addresses associated with call instructions as they are executed. When a return instruction is executed, the RTIT support 122 may determine whether the target address of the return instruction matches the logged return address of the corresponding call instruction. If those addresses do not match—that is, if the return instruction is mispredicted—the RTIT support 122 may output a data packet including the target address of the return instruction. In some embodiments, the RTIT support 122 may compress the trace data for some or all predicted returns by outputting only a bit indicating that a return instruction was taken. A processing device implementing minimizing bandwidth to track return targets by an instruction tracing system is described in Strong et al., U.S. Patent Application Publication No. 2014/0337604, filed on May 9, 2013. The RTIT support 122 may be embodied as, for example, Intel® Processor Trace (PT) technology.

Similarly, the memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices.

In some embodiments, the computing device 100 may also include communication circuitry 130 and one or more peripheral devices 132. The communication circuitry 130 of the computing device 100 may be embodied as any communication circuit, device, or collection thereof, capable of enabling communications between the computing device 100 and other remote devices over a computing network. The communication circuitry 130 may be configured to use any one or more communication technology (e.g., wired or wireless communications, Ethernet, Bluetooth®, Wi-Fi®, WiMAX, Infiniband, etc.) and associated protocols (e.g., TCP, UDP, iWARP, RDMA, etc.) to effect such communication. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, and/or other input/output devices, interface devices, and/or peripheral devices.

Figure 2:
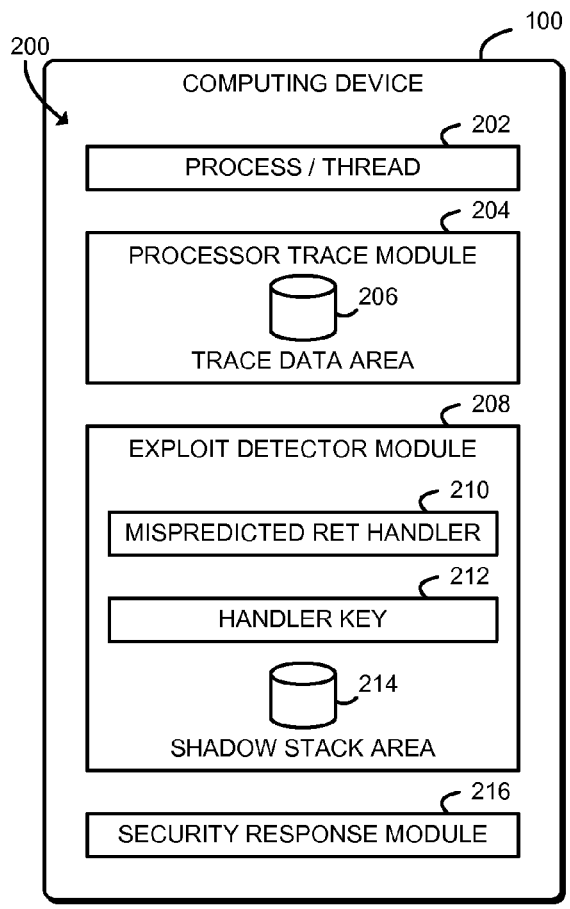
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a process/thread 202, a processor trace module 204, an exploit detector module 208, and a security response module 216. The various modules of the environment 200 may be embodied as hardware, firmware, software, or a combination thereof. For example, the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a processor trace circuit, an exploit detector circuit, etc.).

The process/thread 202 may be embodied as any operating system process, thread, lightweight process, or other program executed by the computing device 100. The process/thread 202 executes a stream of instructions that may include control flow instruction such as call instructions, return instructions, and indirect branch instructions. The process/thread 202 may maintain a stack in the memory 126 used to store return addresses, stack base pointers, function parameters, and other data. In some embodiments, each thread of a process may maintain its own stack. The process/thread 202 may execute in user mode or otherwise execute with limited privileges.

The processor trace module 204 is configured to generate trace data indicative of control flow of the process/thread 202 executed by the computing device 100. The processor trace module 204 may include, invoke, or otherwise use the RTIT support 122 of the processor 120 to generate part or all of the trace data. The trace data may be stored in a trace data area 206 in the memory 126. The trace data area 206 may be marked as write-only or otherwise protected from unauthorized access or modification. In some embodiments, the trace data area 206 may be inaccessible to unprivileged software. Additionally, in some embodiments, the processor trace module 204 may be configured to detect a mispredicted return instruction as it is executed and invoke a mispredicted return handler 210, described below, in response to detecting the mispredicted return instruction.

The exploit detector module 208 is configured to analyze the trace data to identify a suspected control flow exploit and determine a cost value associated with the suspected control flow exploit. The exploit detector module 208 may be configured to analyze the trace data using a heuristic algorithm to identify suspected return-oriented programming exploits, or to analyze the trace data for illegitimate branch targets to identify suspected jump-oriented programming exploits.

The exploit detector module 208 may be configured to update a shadow stack associated with the process/thread 202 based on the trace data and analyze the shadow stack using a heuristic algorithm to identify suspected return-oriented programming exploits. The shadow stack may be stored in a shadow stack area 214 in the memory 126, which may be marked as inaccessible or otherwise protected from unauthorized access or modification by unprivileged software. In some embodiments, the exploit detector module 208 may be further configured to determine whether the current shadow stack is valid (e.g., the current shadow stack has not been tampered with) in response to invocation of the mispredicted return handler 210. The mispredicted return handler 210 may be embodied as any function, interrupt service routine, or other procedure that may be executed in the context of the process/thread 202 in response to detection of a mispredicted return instruction. The mispredicted return handler 210 may encode data in the trace data area 206 using a handler key 212. The handler key 212 may be protected from memory disclosure attacks. For example, the handler key 212 may be stored as an immediate value in a memory page marked execute-only using extended page tables (EPT) support of the processor 120.

The security response module 216 is configured to handle the suspected control flow exploit based on the cost value. The security response module 216 may be configured to, for example, notify the user of the suspected exploit, terminate the process/thread 202, or perform any other appropriate security response. The security response module 216 may be configured to handle the suspected control flow exploit if a total cost budget has been exceeded. The exploit detector module 208 may be further configured to identify a non-suspicious instruction or instruction pattern based on the trace data and then reset the total cost budget. In some embodiments, the security response module 216 may be configured to handle the suspected control flow exploit in response to the mispredicted return handler 210 determining that the current shadow stack is not valid.

Figure 3A:
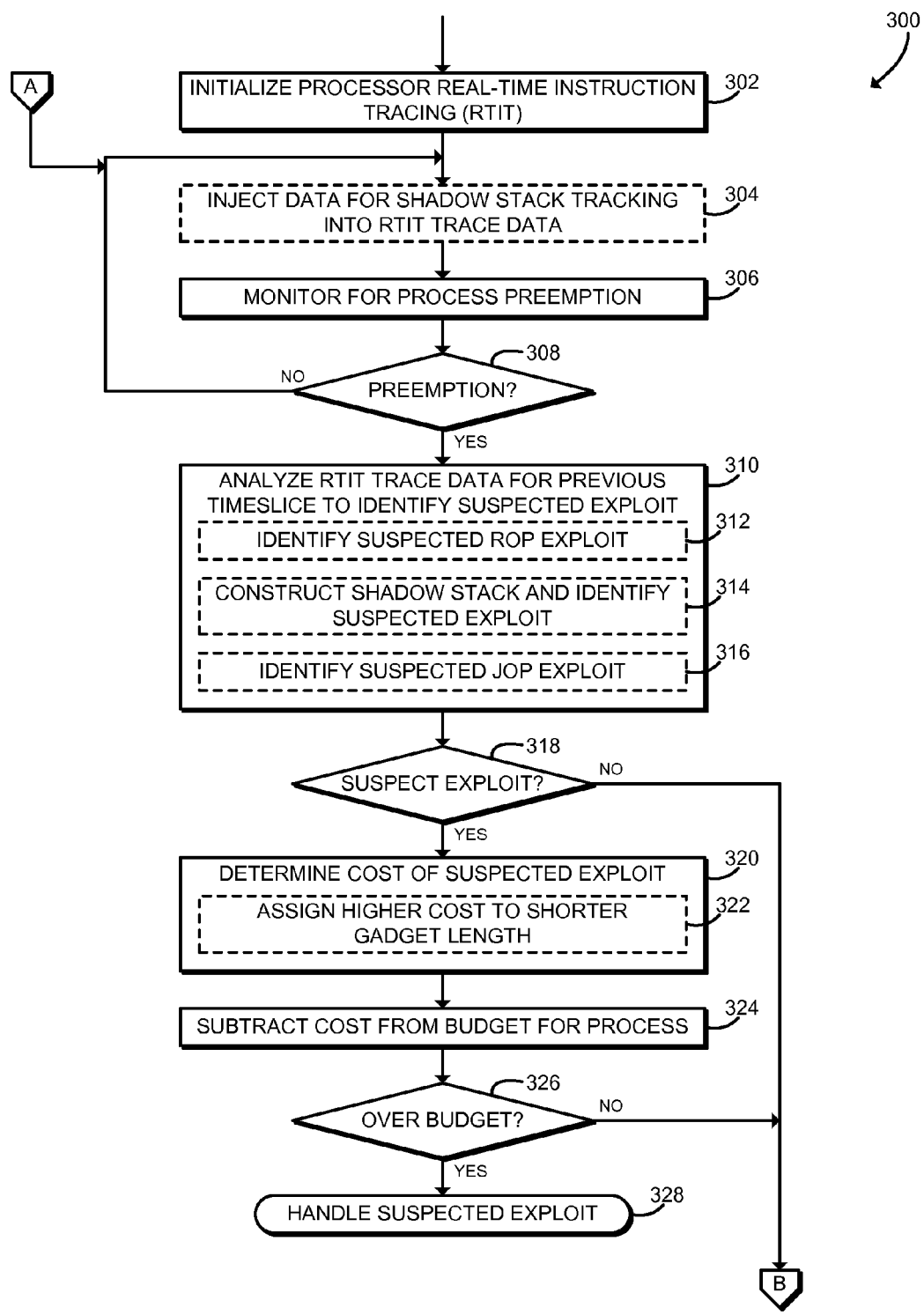
FIGS. 3A and 3B are a simplified flow diagram of at least one embodiment of a method for control flow exploit mitigation that may be executed by the computing device of FIGS. 1 and 2.
Figure 3B:
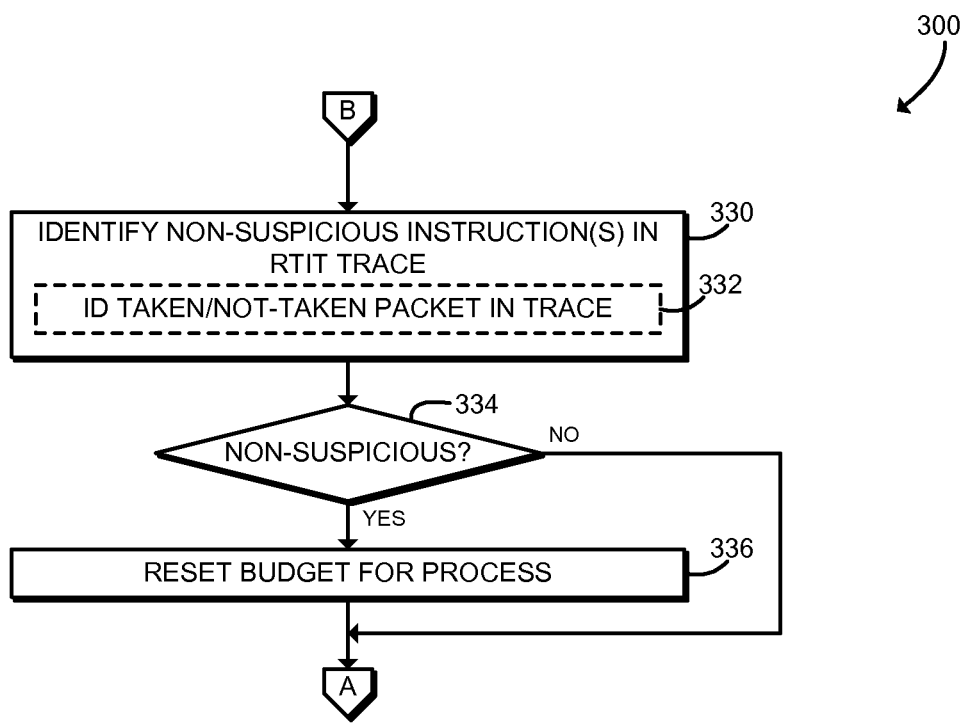

Referring now to FIGS. 3A and 3B, in use, the computing device 100 may execute a method 300 for control flow exploit mitigation. The method 300 begins in block 302, in which the computing device 100 initializes real-time instruction tracing using the RTIT support 122 of the processor 120. The computing device 100 may, for example, execute one or more specialized processor instructions, write to one or more control registers, or otherwise command the processor 120 to enable the RTIT support 122. After enabling the RTIT support 122, the processor 120 generates trace data based on the executed instruction flow. As described above, the trace data may be stored by the processor 120 in the trace data area 206. In some embodiments, in block 304, the computing device 100 may inject additional data into the trace data stream to allow shadow stack monitoring. For example, the computing device 100 may inject additional data packets for direct call instructions, return instructions, or other data. The computing device 100 may inject the data, for example, using a specialized processor instruction such as PTWRITE. The process/thread 202 may be modified to include those specialized processor instructions to output the additional data packets. One illustrative embodiment of a method for outputting additional data packets is described further below in connection with FIG. 5.

In block 306, the computing device 100 monitors for preemption of the process/thread 202. For example, the computing device 100 may monitor for the expiration of a timeslice assigned to the process/thread 202. The computing device 100 may use a hypervisor to monitor for changes to active memory page translation tables, for example monitoring for MOV instructions targeting the CR3 register. By monitoring for preemption of the process/thread 202, the computing device 100 may regularly perform exploit detection while the process/thread 202 is executing. Additionally or alternatively, the computing device 100 may perform exploit detection at other times. For example, in some embodiments the computing device 100 may monitor for other, similar events that recur regularly during execution of the process/thread 202. As another example, in some embodiments the computing device 100 may monitor for one or more events that indicate that the state of the process/thread 202 should be inspected to detect exploits, such as mispredicted return instructions or one or more ROP heuristics as described in Fischer et al., U.S. Patent Application Pub. No. 2014/0123281 and Fischer et al., U.S. Patent Application Pub. No. 2014/0123286.

In block 308, the computing device 100 determines whether process preemption has occurred. If not, the method 300 loops back to block 304 to continue monitoring for process preemption while the processor 120 continues to generate trace data. If process preemption has occurred the method 300 advances to block 310.

In block 310, the computing device 100 analyzes the RTIT trace data generated by the processor 120 during the previous timeslice to identify potential control-flow exploits. In some embodiments, in block 312 the computing device 100 may identify suspected return-oriented programming (ROP) exploits. The computing device 100 may, for example, examine the trace data for suspicious activity using one or more heuristic checks. The computing device 100 may not fully reconstruct the control flow of the process/thread 202, which may improve performance. For example, the computing device 100 may apply one or more heuristic checks to every target instruction pointer (TIP) packet included in the trace data. One illustrative embodiment of a method for identifying suspected ROP exploits is described below in connection with FIG. 4.

In some embodiments, in block 314, the computing device 100 may construct and/or maintain a shadow stack in the shadow stack area 214 based on the trace data and identify suspected ROP exploits by comparing the active system stack to the shadow stack. The computing device 100 may, for example, examine the system stack for suspicious activity using one or more heuristic checks as described in U.S. patent application Ser. No. 14/498,075, filed on Sep. 26, 2014, and entitled Hardware Shadow Stack Support for Legacy Guests. Additionally or alternatively, in some embodiments the computing device 100 may maintain the shadow stack by monitoring for certain control flow instructions using the hardware RTIT support 122 of the processor 120 as further described below in connection with FIGS. 6-8.

In some embodiments, in block 316, the computing device 100 may identify suspected jump-oriented programming (JOP) exploits. The computing device 100 may inspect the destination of target instruction pointer (TIP) packets stored in the trace data. TIP packets may be generated, for example, in response to invocation of indirect call instructions or in response to execution of mispredicted return instructions (that is, return instructions that do not correspond to an observed call instruction) or some or all predicted return instructions. The computing device 100 may compare the target address of each TIP packet to a database of allowable branch destinations. Each allowable branch destination may correspond, for example, to the beginning of a function. Thus, the computing device 100 may detect indirect branches to disallowed branch targets. The processor 120 may not generate TIP packets for direct branch instructions; however, direct branch instructions are implicitly authorized by the compiler that emitted them, meaning that any unintended direct branches could only be reached indirectly after execution of an indirect branch instruction with a disallowed target address.

In block 318, the computing device 100 determines whether a suspected exploit has been found. If not, the method 300 branches ahead to block 330, shown in FIG. 3B and described below. If a suspected exploit has been found, the method 300 advances to block 320.

In block 320, the computing device 100 determines a cost value associated with the suspected exploit. The cost value associated with the suspected exploit indicates the likelihood that the suspected exploit is an actual exploit. In some embodiments, in block 322, the computing device 100 may assign a higher cost value to suspected exploits with a shorter gadget length. The gadget length identifies the distance between the entry point into the ROP gadget and the return instruction at the end of the gadget. Typical ROP gadgets are short; thus, short gadget length indicates the possibility of malicious behavior and accordingly has a higher cost value.

The computing device 100 may estimate the ROP gadget length by searching in memory for a return instruction opcode starting at the target address of a TIP packet. The computing device 100 may search within a short distance in memory, for example, 280 bytes. The gadget length may be reduced by a constant modifier (e.g., 9 bytes) if the gadget length is over a threshold (e.g., 10 bytes). If the gadget length is below the threshold, the gadget length may be set to a minimum value (e.g., 1 byte), so that all gadgets shorter than the threshold are treated similarly. Those adjustments avoid treating individual short processor instructions as dramatically more suspicious than individual longer instructions, which may be important for processor instruction sets with variable instruction length. The cost value may be computed by dividing a maximum gadget length (e.g., 280 bytes) by the adjusted gadget length. Thus, the cost value increases rapidly as the gadget length shortens. The cost value may be computed by evaluating Equations 1 and 2, shown below.

$$AdjustedGadgetLength = \begin{cases} GadgetLength - c & \text{if } GadgetLength > Threshold \\ MinGadgetLength & \text{else} \end{cases} \quad (1)$$

$$\text{cost value} = \frac{MaxGadgetLength}{AdjustedGadgetLength} \quad (2)$$

In block 324, the computing device 100 subtracts the cost value associated with the suspected exploit from a cost budget. The cost budget may be associated with the current process/thread 202. Thus, the cost budget may become depleted as the computing device 100 detects several suspected exploits. In block 326, the computing device 100 determines whether the cost budget has been exceeded (e.g., the current cost budget value is zero or below zero). If not, the method 300 branches ahead to block 330, shown in FIG. 3B and described below. If the cost budget has been exceeded, the method 300 advances to block 328, in which the computing device 100 handles the suspected exploit. The computing device 100 may perform any appropriate security operation to handle the suspected exploit. For example, the computing device 100 may terminate the current process/thread 202. Additionally or alternatively, the computing device 100 may report the suspected exploit, for example by notifying a user, logging the suspected exploit, or otherwise indicating that a suspected exploit has occurred. After handling the suspected exploit, the method 300 is completed.

Referring back to block 326, if the cost budget has not been exceeded, the method 300 branches ahead to block 330 shown in FIG. 3B. Referring now to FIG. 3B, in block 330 the computing device 100 identifies any non-suspicious instructions or combinations of instructions in the RTIT trace data. The non-suspicious instructions may be embodied as any instructions or combinations of instructions that are not likely to be executed by a control flow exploit. In some embodiments, in block 332 the computing device 100 identifies taken/not-taken packets in the trace data. Taken/not-taken packets may correspond to direct branch instructions or correctly predicted return instructions and are typically not executed by ROP exploits or other control flow exploits.

In block 334, the computing device 100 determines whether non-suspicious instructions have been detected. If not, the method 300 loops back to block 304 to continue monitoring for process preemption while tracing execution of the process/thread 202. If non-suspicious instructions have been detected, the method 300 advances to block 336, in which the computing device 100 resets the cost budget for the current process/thread 202. After resetting the cost budget, the method 300 loops back to block 304 to continue monitoring for process preemption while tracing execution of the process/thread 202.

Figure 4:
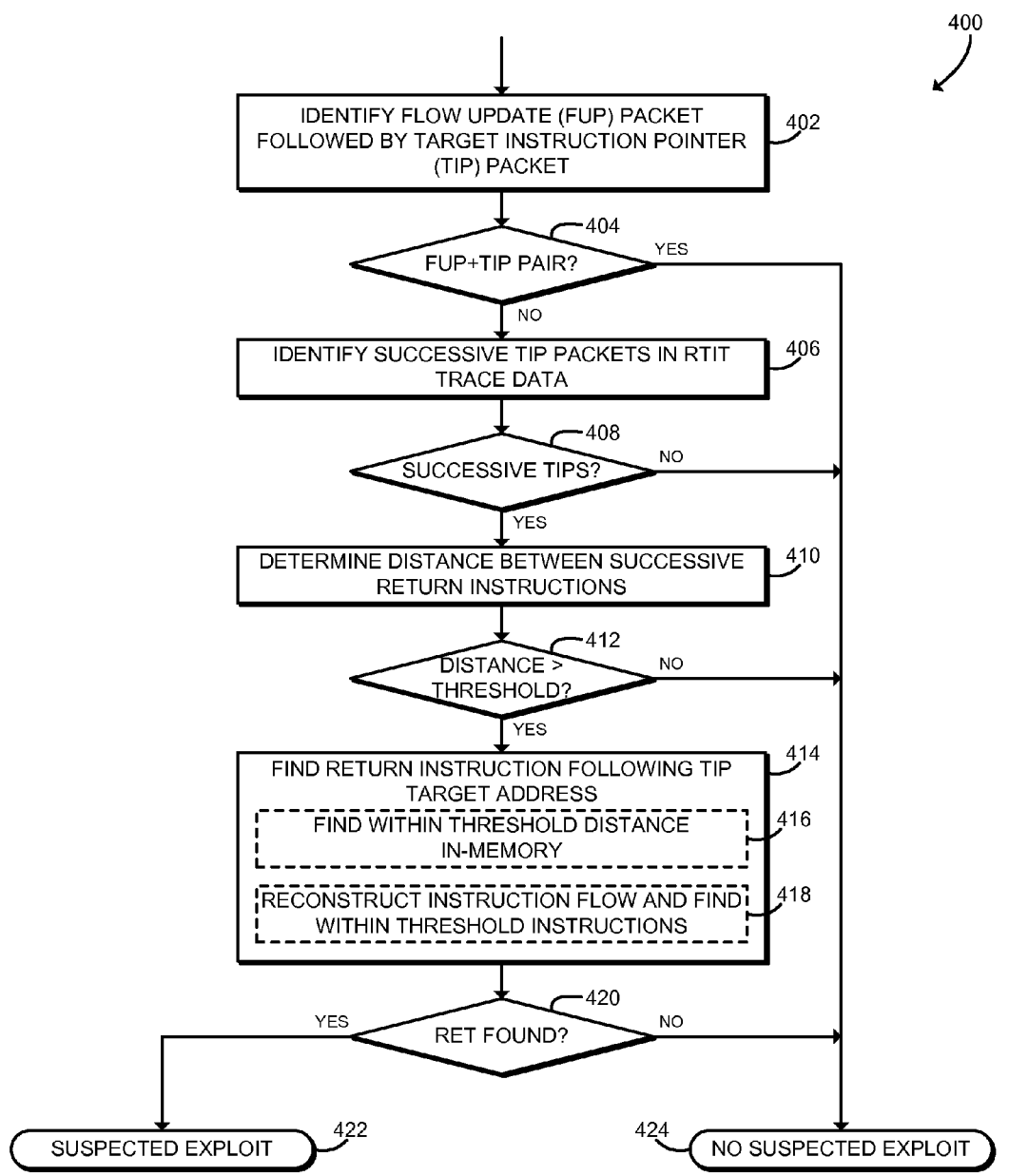
FIG. 4 is a simplified flow diagram of at least one embodiment of a method for heuristic control flow exploit detection that may be executed by the computing device of FIGS. 1 and 2.

Referring now to FIG. 4, in use, the computing device 100 may execute a method 400 for return-oriented programming (ROP) exploit detection. The method 400 may be executed periodically to detect potential ROP exploits. For example, as described above in connection with block 312 of FIG. 3A, the method 400 may be invoked to evaluate each target instruction pointer (TIP) packet included in the real-time instruction tracing (RTIT) trace data. The method 400 begins in block 402, in which the computing device 100 identifies a flow update (FUP) packet followed by a target instruction pointer (TIP) packet in the trace data. FUP packets may be generated in response to operations such as interrupts, enabling transactional memory, or other operations unrelated to control flow exploits. Thus, the computing device 100 may filter out or otherwise disregard the combination of a FUP packet followed by a TIP packet. In block 404, the computing device 100 determines whether a FUP packet immediately followed by a TIP packet has been identified. If so, the method 400 branches to block 424, in which the computing device 100 determines that the analyzed TIP packet is not related to a suspected exploit. After executing block 424, the method 400 is completed. The method 400 may be executed repeatedly to analyze additional TIP packets in the trace data. Referring back to block 404, if a FUP packet followed by a TIP packet is not identified, the method 400 advances to block 406.

In block 406, the computing device 100 identifies successive TIP packets included in the RTIT trace data. ROP exploits involve execution of return instructions that are not consistent with ordinary call/return semantics. Thus, a ROP exploit will generate at least one TIP packet (assuming the RTIT support 122 implements conservative return compression). Additionally, typical ROP exploits involve a chain of return instructions that generate several TIP packets in quick succession. Of course, non-return instructions may also generate TIP packets, but preliminary experiments using sample ROP exploits have indicated that testing for successive TIP packets produces acceptable results even in the presence of TIP packets generated by non-return instructions. In block 408, the computing device 100 determines whether at least two TIP packets occurred in succession. If not, the method 400 branches to block 424 to determine that the analyzed TIP packet is not related to a suspected exploit, as described above. If at least two TIP packets occurred in succession, the method 400 advances to block 410.

In block 410, the computing device 100 determines a distance in memory between two memory addresses associated with the two successive TIP packets. The computing device 100 may determine the distance between the target instruction pointer associated with the TIP packets or the distance between the addresses of the return instructions that generated the TIP packets. Typical ROP gadgets are scattered widely in memory, and thus both the return instruction at the end of each gadget and the target instruction pointer of the return instruction (i.e., the entry point to the ROP gadget) are scattered widely in memory. In block 412, the computing device 100 determines whether the distance between the addresses is greater than a threshold distance. For example, the threshold distance may be 4096 bytes, the size of a memory page, or any other appropriate size. If the distance is not greater than the threshold, the method 400 branches to block 424 to determine that the analyzed TIP packet is not related to a suspected exploit, as described above. If the distance is greater than the threshold, the method 400 advances to block 414.

In block 414, the computing device 100 finds a return instruction in memory following the target address of the TIP packet. ROP gadgets end with a return instruction. Thus, finding a return instruction in memory within a short distance following the target address may indicate that the TIP packet is associated with an ROP gadget. The computing device 100 may search linearly through memory for an opcode of a return instruction. Of course, searching for an opcode is an imprecise test, for example because the return opcode may not be reachable from the target address or the return opcode may not be associated with a return instruction (e.g., the opcode may be an immediate value or part of a longer instruction). However, preliminary tests using sample ROP exploits have indicated that searching for the opcode produces acceptable results. Because ROP gadgets are typically short, the computing device 100 may limit its search for the return opcode. In some embodiments, in block 416, the computing device 100 may search for the return instruction within a threshold distance in memory, for example 280 bytes. In some embodiments, in block 418, the computing device 100 may reconstruct instruction flow starting at the target address of the TIP packet and search for a return instruction within a threshold number of instructions.

In block 420, the computing device 100 determines whether a return instruction was found. If not, the method 400 branches to block 424 to determine that the analyzed TIP packet is not related to a suspected exploit, as described above. If a return instruction was found, the method 400 branches to block 422. In block 422, the computing device 100 determines that the analyzed TIP packet is related to a suspected ROP exploit. After execution of the block 422, the method 400 is completed. As described above in connection with FIG. 3A, the computing device 100 may proceed to determine a cost value associated with the suspected exploit and may generate an appropriate security response.

Figure 5:
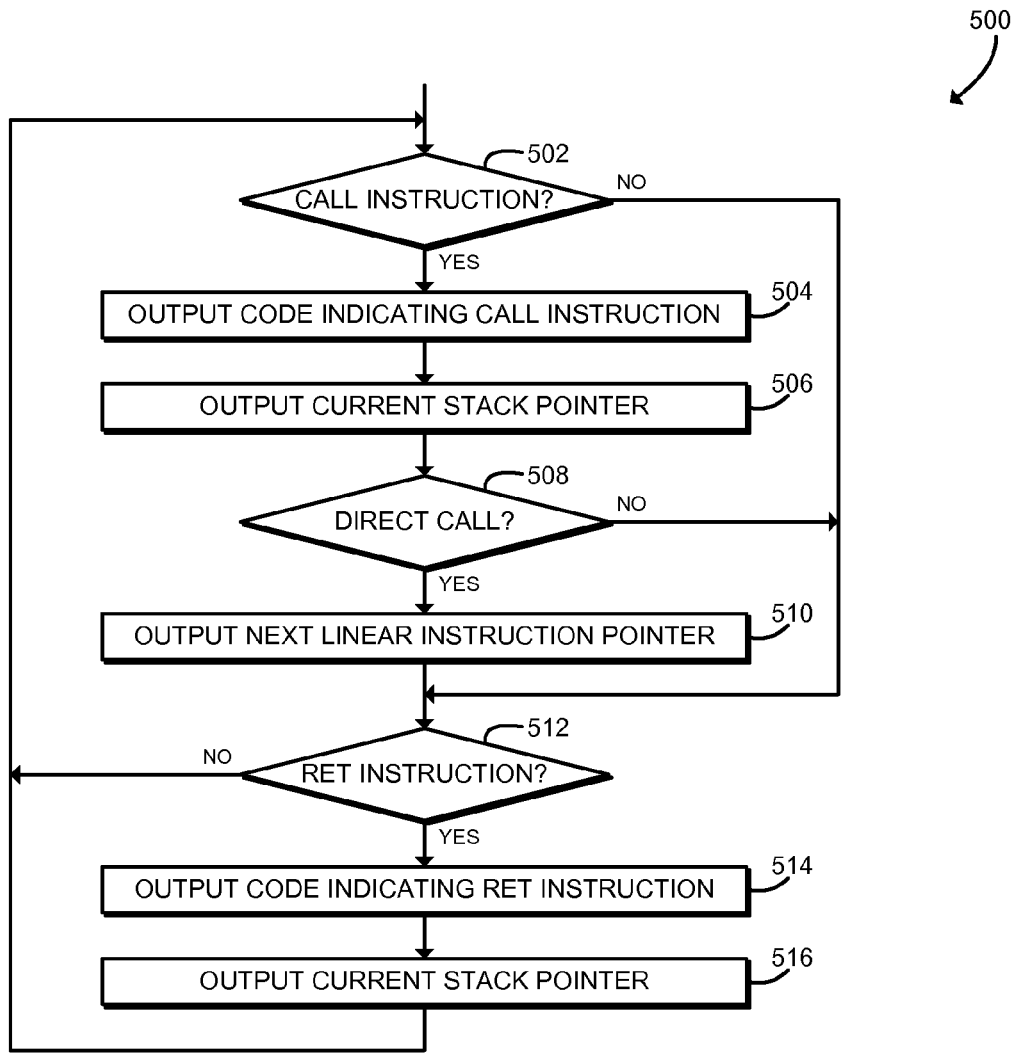
FIG. 5 is a simplified flow diagram of at least one embodiment of a method for processor instruction tracing that may be executed by the computing device of FIGS. 1 and 2.

Referring now to FIG. 5, in use, the computing device 100 may execute a method 500 for control flow tracing. The method 500 may be executed during execution of the process/thread 202 to enable shadow stack tracking and analysis. For example, the method 500 may be executed by the process/thread 202 during its assigned timeslice, as described above in connection with block 304 of FIG. 3A. The method 500 may be embodied as one or more instructions inserted into the process/thread 202, for example during program compilation. The method 500 begins in block 502, in which the computing device 100 determines whether a call instruction is being executed by the process/thread 202. If not, the method 500 branches ahead to block 512, described below. If a call instruction is being executed, the method 500 advances to block 504.

In block 504, the computing device 100 outputs a code (e.g., a magic number) to the trace data indicating that a call instruction is about to occur. The computing device 100 may execute a specialized processor instruction such as PTWRITE to output the code to the trace data. In block 506, the computing device 100 outputs the current stack pointer to the trace data. Similarly, the computing device 100 may execute a specialized processor instruction such as PTWRITE to output the stack pointer. Outputting the stack pointer value may allow the computing device 100 to distinguish between multiple stacks in use by the process/thread 202, for example, when a process includes multiple threads.

In block 508, the computing device 100 determines whether the call instruction is a direct call. A direct call includes the destination address or destination offset as an operand value of the instruction. An indirect call determines the destination address based on the contents of a register or memory location. If the call instruction is not a direct call (i.e., it is an indirect call), the method 500 branches ahead to block 512, described below. If the call instruction is a direct call, the method 500 advances to block 510. In block 510, the computing device 100 outputs the next linear instruction pointer value to the trace data. The next linear instruction pointer value corresponds to the return address pushed on the stack by the direct call instruction. The computing device 100 may execute a specialized processor instruction such as PTWRITE to output the return address. Note that the RTIT support 122 of the processor 120 automatically creates a target instruction pointer (TIP) packet with the next linear instruction pointer for indirect call instructions and thus that data need not be output as part of the method 500.

In block 512, the computing device 100 determines whether a return instruction is being executed by the process/thread 202. If not, the method 500 loops back to block 502 to continue monitoring instructions executed by the process/thread 202. If a return instruction is being executed, the method 500 advances to block 514.

In block 514, the computing device 100 outputs a code (e.g., a magic number) to the trace data indicating that a return instruction is about to occur. The computing device 100 may execute a specialized processor instruction such as PTWRITE to output the code to the trace data. In block 516, the computing device 100 outputs the current stack pointer to the trace data. Similarly, the computing device 100 may execute a specialized processor instruction such as PTWRITE to output the stack pointer. As described above, outputting the stack pointer value may allow the computing device 100 to distinguish between multiple stacks in use by the process/thread 202, for example, when a process includes multiple threads. Note that there is no need to output the return address to the trace data as part of the method 500, because the RTIT support 122 of the processor 120 will automatically output a TIP packet with the return address for mispredicted return instructions, and the return address may be determined from the shadow stack for correctly predicted return instructions. After outputting the stack pointer, the method 500 loops back to block 502 to continue monitoring instructions executed by the process/thread 202.

Figure 6:
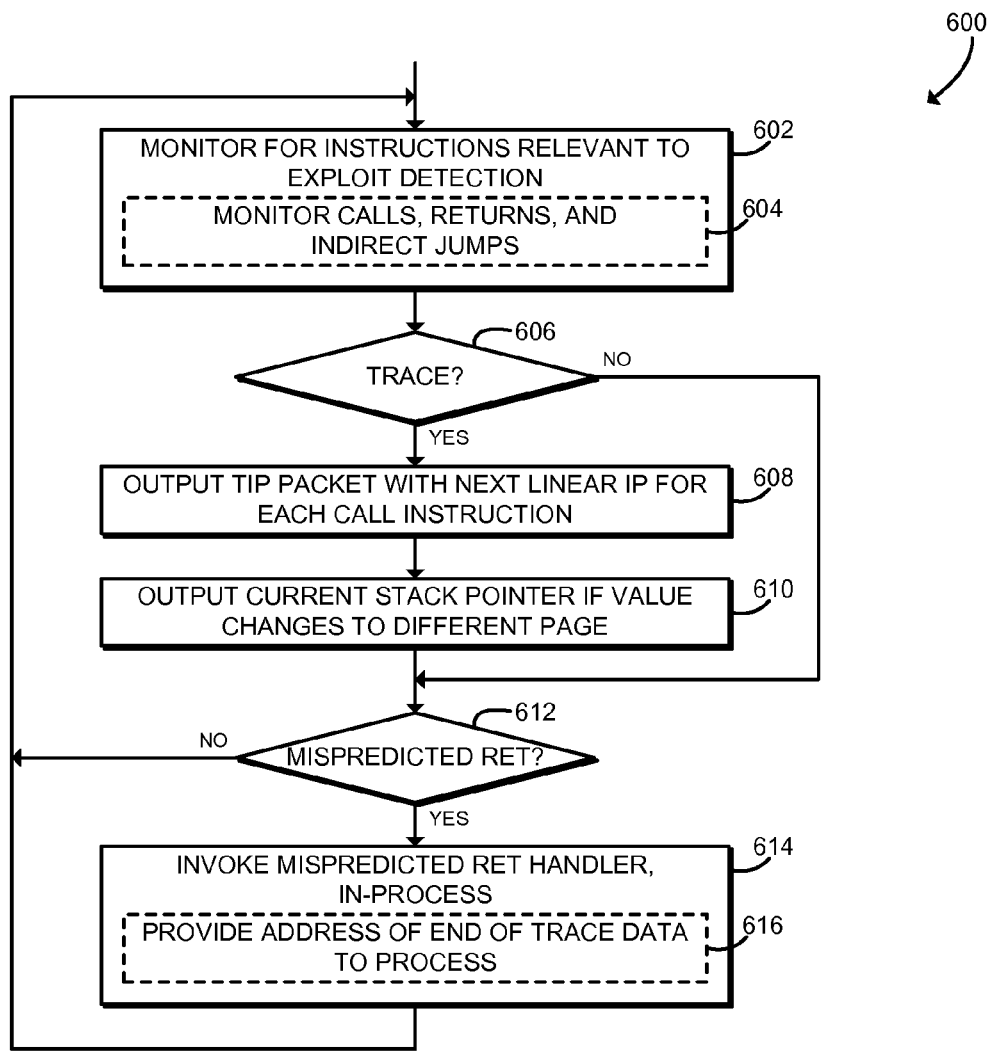
FIG. 6 is a simplified flow diagram of at least one embodiment of a method for processor instruction tracing and exploit detection that may be executed by the computing device of FIGS. 1 and 2.

Referring now to FIG. 6, in use, the computing device 100 may execute a method 600 for processor instruction tracing and exploit detection. The method 600 may be executed by hardware resources of the computing device 100, such as the RTIT support 122 of the processor 120. Thus, the method 600 may be executed transparently to the process/thread 202 executed by the computing device 100. The method 600 begins in block 602, in which the computing device 100 monitors for executed instructions relevant to control flow exploit detection. In some embodiments, in block 604 the computing device 100 may monitor for call instructions, return instructions, and indirect jump instructions. Additionally or alternatively, the computing device 100 may monitor for any instruction that may be used similarly to an indirect jump instruction, such as certain combinations of transactional memory instructions. In block 606, the computing device 100 determines whether to trace the executed instruction; that is, the computing device 100 determines whether an instruction relevant to control flow exploit detection has been detected. If not, the method 600 branches ahead to block 612, described below. If the computing device 100 determines to trace the current instruction, the method 600 advances to block 608.

In block 608, the computing device 100 outputs a target instruction pointer (TIP) packet including the next linear instruction pointer for each call instruction. The trace data output by the computing device 100 is read-only to the process/thread 202, which may prevent malicious software from modifying the trace data. The trace data may be protected, for example, using page tables of the processor 120. The computing device 100 may output the TIP packet to the trace data area 206 used for debugging-oriented RTIT, or may output the TIP packet to a specialized data area used for control flow exploit detection. In block 610, the computing device 100 outputs the current stack pointer value to the trace data if its value has changed to a different memory page from the last traced call instruction or return instruction. Outputting the stack pointer value following large changes may help detect stack pivots or other attacks involving changing the active stack. Of course, the computing device 100 may also output other trace information such as taken/not taken packets for conditional branches or returns, TIP packets for indirect jumps, metadata such as synchronization packets, and other information.

In block 612, the computing device 100 determines whether a mispredicted return instruction has been executed. As described above, when a call instruction is executed, a return address (the next linear instruction pointer value) is pushed onto the system stack. When a return instruction is executed, a return address is popped off the stack and the processor 120 jumps to that return address. For a computing device 100 performing conservative call/return consistency checks as described in Strong et al., U.S. Patent Application Publication No. 2014/0337604, a return instruction may be mispredicted when the return address popped off the stack does not match the return address pushed onto the stack by the call instruction at the corresponding depth in the stack. Mispredicted return instructions may result from ROP exploits or may result from non-malicious software behavior. The RTIT support 122 of the processor 120 may use any technique for identifying mispredicted return instructions, for example using a dedicated hardware buffer to maintain a stack of return addresses associated with call instructions. If a mispredicted return instruction was not executed, the method 600 loops back to block 602 to continue monitoring for instructions relevant for control flow exploit detection. If a mispredicted return instruction was executed, the method 600 advances to block 614. Additionally, although illustrated as determining whether a mispredicted return instruction has been executed, it should be understood that in some embodiments the computing device 100 may monitor for other suspicious activities, for example using one or more ROP heuristics as described in Fischer et al., U.S. Patent Application Pub. No. 2014/0123281 and Fischer et al., U.S. Patent Application Pub. No. 2014/0123286.

In block 614, the computing device 100 invokes the mispredicted return handler 210 in the process space of the process/thread 202. The computing device 100 may use any technique for invoking the mispredicted return handler 210, such as raising an interrupt or trap, executing a callback, or jumping to a particular address associated with the mispredicted return handler 210. The mispredicted return handler 210 is invoked in the process space of the process/thread 202 and thus may execute with user-level privileges. Additionally or alternatively, in some embodiments the mispredicted return handler 210 may be invoked in the process space of an operating system and/or hypervisor. In some embodiments, in block 616 the computing device 100 may provide an address pointing to the end of the trace data to the process/thread 202. The address may be provided, for example, in a processor 120 register or as a stack parameter. Providing the location of the trace data directly to the process/thread 202 may allow the process/thread 202 to access the trace data without a potentially expensive call to an operating system and/or hypervisor. After invoking the mispredicted return handler 210, the method 600 loops back to block 602 to monitor for additional instructions relevant to control flow exploit detection.

Figure 7:
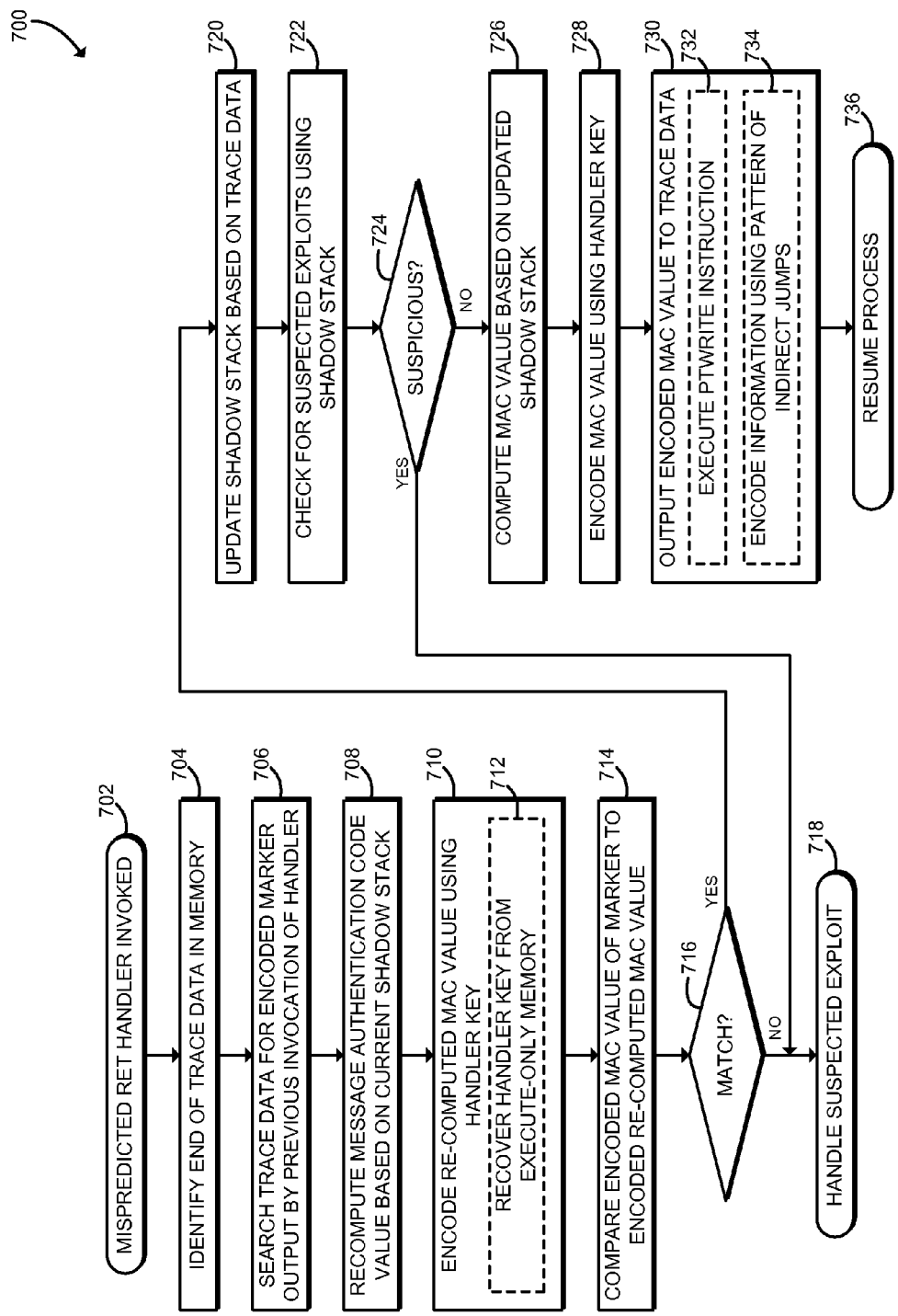
FIG. 7 is a simplified flow diagram of at least one embodiment of a method for control flow exploit detection that may be executed by the computing device of FIGS. 1 and 2.

Referring now to FIG. 7, in use, the computing device 100 may execute a method 700 for shadow stack management and control flow exploit detection. The method 700 may be executed as a part of the mispredicted return handler 210 in the process space of the process/thread 202. Additionally or alternatively, as described above, the method 700 may be executed as part of a suspected control flow exploit handler in response to detection of other suspicious activities, for example using one or more ROP heuristics as described in Fischer et al., U.S. Patent Application Pub. No. 2014/0123281 and Fischer et al., U.S. Patent Application Pub. No. 2014/0123286. The method 700 begins in block 702, in which the computing device 100 invokes the mispredicted return handler 210. As described above in connection with block 614 of FIG. 6, hardware resources of the computing device 100, such as the RTIT support 122 of the processor 120, may invoke the mispredicted return handler 210 in response to detecting execution of a mispredicted return instruction. In block 704, the computing device 100 identifies the end of trace data in the memory 126. The computing device 100 may identify the end of the trace data using a pointer value provided by hardware resources during invocation of the mispredicted return handler 210, for example in a processor 120 register or in a stack parameter.

In block 706, the computing device 100 searches backwards in the trace data for an encoded marker that was output during the previous invocation of the mispredicted return handler 210. Of course, during the first invocation of the mispredicted return handler 210, the computing device 100 may search backwards for a default marker or otherwise search for the beginning of the trace data. The encoded marker includes a keyed message authentication code (MAC) based on a snapshot of a shadow stack at the time of the previous invocation of the mispredicted return handler 210.

In block 708, the computing device 100 re-computes a MAC value based on the current contents of the shadow stack. The computing device 100 may use any technique or algorithm to compute the MAC value, for example calculating a hash value based on the contents of the shadow stack.

In block 710, the computing device 100 encodes the re-computed MAC using the handler key 212. The handler key 212 may be stored in protected memory 126 that is not readable by the process/thread 202, and thus may not be vulnerable to memory disclosure attacks. In some embodiments, in block 712, the computing device 100 recovers the handler key 212 from execute-only memory. For example, the handler key 212 may be stored as an immediate value in execute-only memory, which may be protected using extended page tables (EPT) support of the processor 120.

In block 714, the computing device 100 compares the encoded MAC value from the marker determined in block 706 to the encoded recomputed MAC value determined in block 710. If the encoded MAC values match, then the shadow stack has not changed since the last invocation of the mispredicted return handler 210. Conversely, if the encoded MAC values do not match, then the shadow stack has been tampered with or otherwise modified since the last invocation of the mispredicted return handler 210.

In block 716, the computing device 100 determines whether the encoded MAC values match. If not, the method 700 branches to block 718, in which the computing device 100 handles a suspected ROP exploit. The computing device 100 may, for example, examine the system stack for suspicious activity using one or more heuristic checks as described in U.S. patent application Ser. No. 14/498,075, filed on Sep. 26, 2014, and entitled Hardware Shadow Stack Support for Legacy Guests. After handling the suspected exploit, the method 700 is completed and ordinary execution of the process/thread 202 may resume. Although illustrated as comparing encoded MAC values, it should be understood that in some embodiments the computing device 100 may compare decoded MAC values, for example by decoding an encoded MAC value recovered from the trace data as described above in block 706.

Referring back to block 716, if the encoded MAC values match the method 700 advances to block 720, in which the computing device 100 updates the shadow stack based on the trace data. The computing device 100 may push return addresses corresponding to recorded call instructions onto the shadow stack, pop return addresses corresponding to predicted return instructions, push or pop stack base pointers, or otherwise perform any operation required to update the shadow stack to match the traced control flow of the process/thread 202.

In block 722, the computing device 100 checks for suspected ROP exploits using the shadow stack. The computing device 100 may, for example, examine the system stack for suspicious activity using one or more heuristic checks as described in U.S. patent application Ser. No. 14/498,075, filed on Sep. 26, 2014, and entitled Hardware Shadow Stack Support for Legacy Guests. In block 724, the computing device 100 determines whether suspicious activity has been identified. If so, the method 700 branches to block 718 to handle a suspected ROP exploit, as described above. If the computing device 100 does not identify suspicious activity, the method 700 advances to block 726.

In block 726, the computing device 100 computes a MAC value based on the updated shadow stack. As described above in relation to block 712, the computing device 100 may use any technique or algorithm to compute the MAC value, for example calculating a hash value based on the contents of the shadow stack. In block 728, the computing device 100 encodes the MAC value using the handler key 212. As described above, the handler key 212 is not readable by the process/thread 202, and thus the computing device 100 may recover the handler key 212 from execute-only memory.

Figure 8:
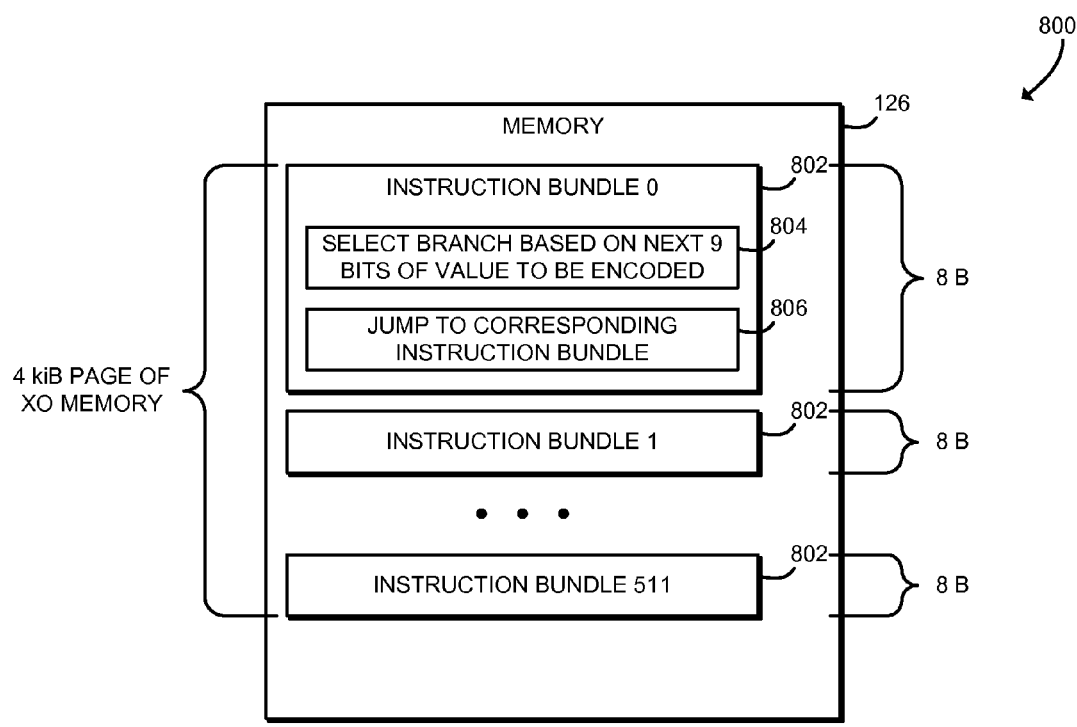
FIG. 8 is a schematic diagram illustrating a memory page that may be executed by the method of FIG. 7.

In block 730, the computing device 100 outputs the encoded MAC value to the trace data. In some embodiments, in block 732 the computing device 100 may output the encoded MAC value using a specialized processor instruction such as PTWRITE. In some embodiments, in block 734, the computing device 100 may output the encoded MAC by executing a pattern of indirect jumps to output trace data that may be used to determine the encoded MAC. The RTIT support 122 of the processor 120 may automatically output a target instruction pointer (TIP) packet to the trace data for each indirect jump. Thus, the computing device 100 may encode the encoded MAC value into a series of TIP packets by executing a carefully constructed series of indirect jumps. As an illustrative example, and referring now to FIG. 8, the schematic diagram 800 illustrates a single 4 kiB (4096-byte) page of the memory 126 that has been set to be executable-only, for example using extended page tables (EPT). The memory 126 includes several instruction bundles 802. Each instruction bundle 802 includes instructions 804 to select an indirect branch target based on the next 9 bits of the value to be encoded. Each instruction bundle 802 further includes instructions 806 to jump to the instruction bundle 802 corresponding to that indirect branch target. Each instruction bundle 802 occupies 8 bytes of memory; thus, a single 4 kiB page of the memory 126 includes 512 instruction bundles 802. During execution, the RTIT support 122 outputs a TIP packet that identifies the instruction bundle 802 that is the target of each indirect jump. Because there are 512 (i.e., $2^9$) possible instruction bundles 802, each TIP packet may encode up to 9 bits of the original encoded MAC. Of course, FIG. 8 is merely illustrative, and in other embodiments different sizes and/or numbers of instruction bundles or memory pages may be used. Additionally, or alternatively, in some embodiments the RTIT support 122 may record the target address of direct jump instructions, and in those embodiments the instruction bundles may include direct jumps.

Referring back to FIG. 7, after outputting the encoded MAC value, in block 736 the computing device 100 resumes execution of the process/thread 202. The computing device 100 may return from a callback instruction, interrupt vector, or otherwise resume processing of the process/thread 202. As described above, the method 700 may be executed repeatedly in response to future invocations of the mispredicted return handler 210.

EXAMPLES

Illustrative examples of the technologies disclosed herein are provided below. An embodiment of the technologies may include any one or more, and any combination of, the examples described below.

Example 1 includes a computing device for exploit mitigation, the computing device comprising a processor comprising a processor trace module to generate trace data indicative of control flow of a process of the computing device; an exploit detector module to (i) analyze the trace data to identify a suspected control flow exploit and (ii) determine a cost value in response to identification of the suspected control flow exploit, wherein the cost value is indicative of a likelihood that the suspected control flow exploit is an actual control flow exploit; and a security response module to handle the suspected control flow exploit based on the cost value.

Example 2 includes the subject matter of Example 1, and wherein to analyze the trace data to identify the suspected control flow exploit comprises to analyze the trace data using a heuristic algorithm to identify a suspected return-oriented programming exploit.

Example 3 includes the subject matter of any of Examples 1 and 2, and wherein to analyze the trace data using the heuristic algorithm to identify the suspected return-oriented programming exploit comprises to identify a first target instruction pointer packet in the trace data, wherein the first target instruction pointer packet is associated with a destination address; find a return instruction in memory following the destination address of the first target instruction packet; and identify the suspected return-oriented programming exploit in response to finding the return instruction in memory.

Example 4 includes the subject matter of any of Examples 1-3, and wherein to find the return instruction in memory comprises to search memory for a return instruction opcode within a predefined threshold distance following the destination address of the first target instruction pointer packet.

Example 5 includes the subject matter of any of Examples 1-4, and wherein to find the return instruction in memory comprises to reconstruct an instruction flow starting at the destination address of the first target instruction pointer packet.

Example 6 includes the subject matter of any of Examples 1-5, and wherein to analyze the trace data using the heuristic algorithm to identify the suspected return-oriented programming exploit further comprises to identify a pair of successive target instruction pointer packets in the trace data, wherein the pair of successive target instruction pointer packets includes the first target instruction pointer packet; wherein to identify the suspected return-oriented programming exploit further comprises to identify the suspected return-oriented programming exploit in response to identification of the pair of successive target instruction pointer packets.

Example 7 includes the subject matter of any of Examples 1-6, and wherein to analyze the trace data using the heuristic algorithm to identify the suspected return-oriented programming exploit further comprises to determine an in-memory distance between return instructions associated with the pair of successive target instruction pointer packets; and determine whether the in-memory distance has a predefined relationship with a threshold distance; wherein to identify the suspected return-oriented programming exploit further comprises to identify the suspected return-oriented programming exploit in response to a determination that the in-memory distance has the predefined relationship with the threshold distance.

Example 8 includes the subject matter of any of Examples 1-7, and wherein to analyze the trace data using the heuristic algorithm to identify the suspected return-oriented programming exploit further comprises to determine an in-memory distance between destination addresses associated with the pair of successive target instruction pointer packets; and determine whether the in-memory distance has a predefined relationship with a threshold distance; wherein to identify the suspected return-oriented programming exploit further comprises to identify the suspected return-oriented programming exploit in response to a determination that the in-memory distance has the predefined relationship with the threshold distance.

Example 9 includes the subject matter of any of Examples 1-8, and wherein to analyze the trace data using the heuristic algorithm to identify the suspected return-oriented programming exploit further comprises to determine whether the first target instruction pointer packet is preceded by a flow update packet in the trace data; wherein to identify the suspected return-oriented programming exploit further comprises to identify the suspected return-oriented programming exploit in response to a determination that the first target instruction pointer packet is not preceded by a flow update packet in the trace data.

Example 10 includes the subject matter of any of Examples 1-9, and wherein to determine the cost value in response to identification of the suspected control flow exploit comprises to calculate the cost value as a function of a gadget length of the suspected control flow exploit.

Example 11 includes the subject matter of any of Examples 1-10, and wherein to calculate the cost value comprises to assign a higher cost value to a shorter gadget length.

Example 12 includes the subject matter of any of Examples 1-11, and wherein to determine the cost value in response to identification of the suspected control flow exploit comprises to (i) subtract the cost value from a total cost budget and (ii) determine whether the total cost budget has been exceeded; and to handle the suspected control flow exploit based on the cost value comprises to handle the suspected control flow exploit in response to a determination that the total cost budget has been exceeded.

Example 13 includes the subject matter of any of Examples 1-12, and wherein the exploit detector module is further to identify a non-suspicious instruction based on the trace data; and reset the total cost budget in response to identification of the non-suspicious instruction.

Example 14 includes the subject matter of any of Examples 1-13, and wherein to identify the non-suspicious construction comprises to identify a taken/not-taken packet in the trace data.

Example 15 includes the subject matter of any of Examples 1-14, and wherein to analyze the trace data to identify the suspected control flow exploit comprises to update a shadow stack based on the trace data; and analyze the shadow stack using a heuristic algorithm to identify a suspected return-oriented programming exploit.

Example 16 includes the subject matter of any of Examples 1-15, and wherein to generate the trace data indicative of the control flow of the process of the computing device comprises to output a target instruction pointer packet including a next linear instruction pointer in response to execution of a direct call instruction.

Example 17 includes the subject matter of any of Examples 1-16, and wherein to generate the trace data indicative of the control flow of the process of the computing device further comprises to output a packet including a current stack pointer value in response to execution of a call instruction or a return instruction.

Example 18 includes the subject matter of any of Examples 1-17, and wherein to generate the trace data indicative of the control flow of the process of the computing device further comprises to determine whether a new stack page is being accessed; and to output the packet including the current stack pointer value further comprises to output the packet including the current stack pointer value in response to a determination that the new stack page is being accessed.

Example 19 includes the subject matter of any of Examples 1-18, and wherein to analyze the trace data to identify the suspected control flow exploit comprises to identify a first target instruction pointer packet in the trace data, wherein the first target instruction pointer packet is associated with a destination address; determine whether the destination address is a predefined legitimate branch target; and identify a suspected jump-oriented programming exploit in response to a determination that the destination address is not a predefined legitimate branch target.

Example 20 includes a computing device for real-time exploit mitigation, the computing device comprising a processor comprising a processor trace module to generate trace data indicative of control flow of a process of the computing device; detect a suspected control flow exploit using the trace data; and invoke a suspected control flow exploit handler in response to detection of the suspected control flow exploit; an exploit detector module to determine whether a current shadow stack is valid in response to invocation of the mispredicted return handler; and a security response module to handle the suspected control flow exploit in response to a determination that the current shadow stack is not valid.

Example 21 includes the subject matter of Example 20, and wherein to detect the suspected control flow exploit comprises to detect a mispredicted return instruction using the trace data; and to invoke the suspected control flow exploit handler comprises to invoke a mispredicted return handler in response to detection of the mispredicted return instruction.

Example 22 includes the subject matter of any of Examples 20 and 21, and wherein to invoke the mispredicted return handler comprises to invoke the mispredicted return handler in a process space of the process of the computing device.

Example 23 includes the subject matter of any of Examples 20-22, and wherein to invoke the mispredicted return handler further comprises to provide a memory address associated with the trace data to the process.

Example 24 includes the subject matter of any of Examples 20-23, and wherein to detect the suspected control flow exploit comprises to analyze the trace data using a heuristic algorithm to identify a suspected return-oriented programming exploit.

Example 25 includes the subject matter of any of Examples 20-24, and wherein the exploit detector module is further to update the current shadow stack based on the trace data in response to a determination that the current shadow stack is valid; compute a message authentication code based on the current shadow stack in response to updating of the current shadow stack; encode the message authentication code using a handler key, wherein the handler key is located in a protected memory region; and output the encoded message authentication code to the trace data.

Example 26 includes the subject matter of any of Examples 20-25, and wherein to output the encoded message authentication code comprises to execute a processor instruction to write the encoded message authentication code to the trace data.

Example 27 includes the subject matter of any of Examples 20-26, and wherein to output the encoded message authentication code comprises to execute one or more branch instructions based on the encoded message authentication code to output coded data to the trace data.

Example 28 includes the subject matter of any of Examples 20-27, and wherein to determine whether the current shadow stack is valid comprises to extract an encoded message authentication code from the trace data; compute a second message authentication code based on the current shadow stack; encode the second message authentication code to generate an encoded second message authentication code using a handler key, wherein the handler key is located in a protected memory region; and compare the encoded message authentication code to the encoded second message authentication code.

Example 29 includes the subject matter of any of Examples 20-28, and wherein to encode the second message authentication code comprises to recover the handler key from an immediate value stored in execute-only memory.

Example 30 includes the subject matter of any of Examples 20-29, and wherein to extract the encoded message authentication code from the trace data comprises to identify a memory address associated with the trace data, wherein the memory address is supplied by the processor trace module of the processor; and search in the trace data from the memory address associated with the trace data for the encoded message authentication code.

Example 31 includes the subject matter of any of Examples 20-30, and wherein the exploit detector module is further to resume the process of the computing device in response to a determination that the current shadow stack is valid.

Example 32 includes the subject matter of any of Examples 20-31, and wherein to generate the trace data indicative of the control flow of the process of the computing device comprises to output a target instruction pointer packet including a next linear instruction pointer in response to execution of a direct call instruction.

Example 33 includes the subject matter of any of Examples 20-32, and wherein to generate the trace data indicative of the control flow of the process of the computing device further comprises to determine whether a current stack pointer value is located in a different memory page from a previous stack pointer value; and output a packet including the current stack pointer value in response to execution of a call instruction or a return instruction and a determination that the current stack pointer value is located in a different memory page from the previous stack pointer value.

Example 34 includes a method for exploit mitigation, the method comprising generating, by a processor trace module of a processor of a computing device, trace data indicative of control flow of a process of the computing device; analyzing, by the computing device, the trace data to identify a suspected control flow exploit; determining, by the computing device, a cost value in response to identifying the suspected control flow exploit, wherein the cost value is indicative of a likelihood that the suspected control flow exploit is an actual control flow exploit; and handling, by the computing device, the suspected control flow exploit based on the cost value.

Example 35 includes the subject matter of Example 34, and wherein analyzing the trace data to identify the suspected control flow exploit comprises analyzing the trace data using a heuristic algorithm to identify a suspected return-oriented programming exploit.

Example 36 includes the subject matter of any of Examples 34 and 35, and wherein analyzing the trace data using the heuristic algorithm to identify the suspected return-oriented programming exploit comprises identifying a first target instruction pointer packet in the trace data, wherein the first target instruction pointer packet is associated with a destination address; finding a return instruction in memory following the destination address of the first target instruction packet; and identifying the suspected return-oriented programming exploit in response to finding the return instruction in memory.

Example 37 includes the subject matter of any of Examples 34-36, and wherein finding the return instruction in memory comprises searching memory for a return instruction opcode within a predefined threshold distance following the destination address of the first target instruction pointer packet.

Example 38 includes the subject matter of any of Examples 34-37, and wherein finding the return instruction in memory comprises reconstructing an instruction flow starting at the destination address of the first target instruction pointer packet.

Example 39 includes the subject matter of any of Examples 34-38, and wherein analyzing the trace data using the heuristic algorithm to identify the suspected return-oriented programming exploit further comprises identifying a pair of successive target instruction pointer packets in the trace data, wherein the pair of successive target instruction pointer packets includes the first target instruction pointer packet; wherein identifying the suspected return-oriented programming exploit further comprises identifying the suspected return-oriented programming exploit in response to identifying the pair of successive target instruction pointer packets.

Example 40 includes the subject matter of any of Examples 34-39, and wherein analyzing the trace data using the heuristic algorithm to identify the suspected return-oriented programming exploit further comprises determining an in-memory distance between return instructions associated with the pair of successive target instruction pointer packets; and determining whether the in-memory distance has a predefined relationship with a threshold distance; wherein identifying the suspected return-oriented programming exploit further comprises identifying the suspected return-oriented programming exploit in response to determining that the in-memory distance has the predefined relationship with the threshold distance.

Example 41 includes the subject matter of any of Examples 34-40, and wherein analyzing the trace data using the heuristic algorithm to identify the suspected return-oriented programming exploit further comprises determining an in-memory distance between destination addresses associated with the pair of successive target instruction pointer packets; and determining whether the in-memory distance has a predefined relationship with a threshold distance; wherein identifying the suspected return-oriented programming exploit further comprises identifying the suspected return-oriented programming exploit in response to determining that the in-memory distance has the predefined relationship with the threshold distance.

Example 42 includes the subject matter of any of Examples 34-41, and wherein analyzing the trace data using the heuristic algorithm to identify the suspected return-oriented programming exploit further comprises determining whether the first target instruction pointer packet is preceded by a flow update packet in the trace data; wherein identifying the suspected return-oriented programming exploit further comprises identifying the suspected return-oriented programming exploit in response to determining that the first target instruction pointer packet is not preceded by a flow update packet in the trace data.

Example 43 includes the subject matter of any of Examples 34-42, and wherein determining the cost value in response to identifying the suspected control flow exploit comprises calculating the cost value as a function of a gadget length of the suspected control flow exploit.

Example 44 includes the subject matter of any of Examples 34-43, and wherein calculating the cost value comprises assigning a higher cost value to a shorter gadget length.

Example 45 includes the subject matter of any of Examples 34-44, and wherein determining the cost value in response to identifying the suspected control flow exploit comprises (i) subtracting the cost value from a total cost budget and (ii) determining whether the total cost budget has been exceeded; and handling the suspected control flow exploit based on the cost value comprises handling the suspected control flow exploit in response to determining that the total cost budget has been exceeded.

Example 46 includes the subject matter of any of Examples 34-45, and further including identifying, by the computing device, a non-suspicious instruction based on the trace data; and resetting, by the computing device, the total cost budget in response to identifying the non-suspicious instruction.

Example 47 includes the subject matter of any of Examples 34-46, and wherein identifying the non-suspicious construction comprises identifying a taken/not-taken packet in the trace data.

Example 48 includes the subject matter of any of Examples 34-47, and wherein analyzing the trace data to identify the suspected control flow exploit comprises updating a shadow stack based on the trace data; and analyzing the shadow stack using a heuristic algorithm to identify a suspected return-oriented programming exploit.

Example 49 includes the subject matter of any of Examples 34-48, and wherein generating the trace data indicative of the control flow of the process of the computing device comprises outputting a target instruction pointer packet including a next linear instruction pointer in response to executing a direct call instruction.

Example 50 includes the subject matter of any of Examples 34-49, and wherein generating the trace data indicative of the control flow of the process of the computing device further comprises outputting a packet including a current stack pointer value in response to executing a call instruction or a return instruction.

Example 51 includes the subject matter of any of Examples 34-50, and wherein generating the trace data indicative of the control flow of the process of the computing device further comprises determining whether a new stack page is being accessed; and outputting the packet including the current stack pointer value further comprises outputting the packet including the current stack pointer value in response to determining that the new stack page is being accessed.

Example 52 includes the subject matter of any of Examples 34-51, and wherein analyzing the trace data to identify the suspected control flow exploit comprises identifying a first target instruction pointer packet in the trace data, wherein the first target instruction pointer packet is associated with a destination address; determining whether the destination address is a predefined legitimate branch target; and identifying a suspected jump-oriented programming exploit in response to determining that the destination address is not a predefined legitimate branch target.

Example 53 includes a method for real-time exploit mitigation, the method comprising generating, by a processor trace module of a processor of a computing device, trace data indicative of control flow of a process of the computing device; detecting, by the processor trace module, a suspected control flow exploit using the trace data; invoking, by the processor trace module, a suspected control flow exploit handler in response to detecting the suspected control flow exploit; determining, by the computing device, whether a current shadow stack is valid in response to invoking the mispredicted return handler; and handling, by the computing device, the suspected control flow exploit in response to determining that the current shadow stack is not valid.

Example 54 includes the subject matter of Example 53, and wherein detecting the suspected control flow exploit comprises detecting a mispredicted return instruction using the trace data; and invoking the suspected control flow exploit handler comprises invoking a mispredicted return handler in response to detecting the mispredicted return instruction.

Example 55 includes the subject matter of any of Examples 53 and 54, and wherein invoking the mispredicted return handler comprises invoking the mispredicted return handler in a process space of the process of the computing device.

Example 56 includes the subject matter of any of Examples 53-55, and wherein invoking the mispredicted return handler further comprises providing a memory address associated with the trace data to the process.

Example 57 includes the subject matter of any of Examples 53-56, and wherein detecting the suspected control flow exploit comprises analyzing the trace data using a heuristic algorithm to identify a suspected return-oriented programming exploit.

Example 58 includes the subject matter of any of Examples 53-57, and further including updating, by the computing device, the current shadow stack based on the trace data in response to determining that the current shadow stack is valid; computing, by the computing device, a message authentication code based on the current shadow stack in response to updating the current shadow stack; encoding, by the computing device, the message authentication code using a handler key, wherein the handler key is located in a protected memory region; and outputting, by the computing device, the encoded message authentication code to the trace data.

Example 59 includes the subject matter of any of Examples 53-58, and wherein outputting the encoded message authentication code comprises executing a processor instruction to write the encoded message authentication code to the trace data.

Example 60 includes the subject matter of any of Examples 53-59, and wherein outputting the encoded message authentication code comprises executing one or more branch instructions based on the encoded message authentication code to output coded data to the trace data.

Example 61 includes the subject matter of any of Examples 53-60, and wherein determining whether the current shadow stack is valid comprises extracting, by the computing device, an encoded message authentication code from the trace data; computing, by the computing device, a second message authentication code based on the current shadow stack; encoding, by the computing device, the second message authentication code to generate an encoded second message authentication code using a handler key, wherein the handler key is located in a protected memory region; and comparing, by the computing device, the encoded message authentication code to the encoded second message authentication code.

Example 62 includes the subject matter of any of Examples 53-61, and wherein encoding the second message authentication code comprises recovering the handler key from an immediate value stored in execute-only memory.

Example 63 includes the subject matter of any of Examples 53-62, and wherein extracting the encoded message authentication code from the trace data comprises identifying a memory address associated with the trace data, wherein the memory address is supplied by the processor trace module of the processor; and searching in the trace data from the memory address associated with the trace data for the encoded message authentication code.

Example 64 includes the subject matter of any of Examples 53-63, and further including resuming, by the computing device, the process of the computing device in response to determining that the current shadow stack is valid.

Example 65 includes the subject matter of any of Examples 53-64, and wherein generating the trace data indicative of the control flow of the process of the computing device comprises outputting a target instruction pointer packet including a next linear instruction pointer in response to executing a direct call instruction.

Example 66 includes the subject matter of any of Examples 53-65, and wherein generating the trace data indicative of the control flow of the process of the computing device further comprises determining whether a current stack pointer value is located in a different memory page from a previous stack pointer value; and outputting a packet including the current stack pointer value in response to executing a call instruction or a return instruction and determining that the current stack pointer value is located in a different memory page from the previous stack pointer value.

Example 67 includes a computing device comprising a processor; and a memory having stored therein a plurality of instructions that when executed by the processor cause the computing device to perform the method of any of Examples 34-66.

Example 68 includes one or more machine readable storage media comprising a plurality of instructions stored thereon that in response to being executed result in a computing device performing the method of any of Examples 34-66.

Example 69 includes a computing device comprising means for performing the method of any of Examples 34-66.

Example 70 includes a computing device for exploit mitigation, the computing device comprising means for generating, by a processor trace module of a processor of a computing device, trace data indicative of control flow of a process of the computing device; means for analyzing the trace data to identify a suspected control flow exploit; means for determining a cost value in response to identifying the suspected control flow exploit, wherein the cost value is indicative of a likelihood that the suspected control flow exploit is an actual control flow exploit; and means for handling the suspected control flow exploit based on the cost value.

Example 71 includes the subject matter of Example 70, and wherein the means for analyzing the trace data to identify the suspected control flow exploit comprises means for analyzing the trace data using a heuristic algorithm to identify a suspected return-oriented programming exploit.

Example 72 includes the subject matter of any of Examples 70 and 71, and wherein the means for analyzing the trace data using the heuristic algorithm to identify the suspected return-oriented programming exploit comprises means for identifying a first target instruction pointer packet in the trace data, wherein the first target instruction pointer packet is associated with a destination address; means for finding a return instruction in memory following the destination address of the first target instruction packet; and means for identifying the suspected return-oriented programming exploit in response to finding the return instruction in memory.

Example 73 includes the subject matter of any of Examples 70-72, and wherein the means for finding the return instruction in memory comprises means for searching memory for a return instruction opcode within a predefined threshold distance following the destination address of the first target instruction pointer packet.

Example 74 includes the subject matter of any of Examples 70-73, and wherein the means for finding the return instruction in memory comprises means for reconstructing an instruction flow starting at the destination address of the first target instruction pointer packet.

Example 75 includes the subject matter of any of Examples 70-74, and wherein the means for analyzing the trace data using the heuristic algorithm to identify the suspected return-oriented programming exploit further comprises means for identifying a pair of successive target instruction pointer packets in the trace data, wherein the pair of successive target instruction pointer packets includes the first target instruction pointer packet; wherein the means for identifying the suspected return-oriented programming exploit further comprises means for identifying the suspected return-oriented programming exploit in response to identifying the pair of successive target instruction pointer packets.

Example 76 includes the subject matter of any of Examples 70-75, and wherein the means for analyzing the trace data using the heuristic algorithm to identify the suspected return-oriented programming exploit further comprises means for determining an in-memory distance between return instructions associated with the pair of successive target instruction pointer packets; and means for determining whether the in-memory distance has a predefined relationship with a threshold distance; wherein the means for identifying the suspected return-oriented programming exploit further comprises means for identifying the suspected return-oriented programming exploit in response to determining that the in-memory distance has the predefined relationship with the threshold distance.

Example 77 includes the subject matter of any of Examples 70-76, and wherein the means for analyzing the trace data using the heuristic algorithm to identify the suspected return-oriented programming exploit further comprises means for determining an in-memory distance between destination addresses associated with the pair of successive target instruction pointer packets; and means for determining whether the in-memory distance has a predefined relationship with a threshold distance; wherein the means for identifying the suspected return-oriented programming exploit further comprises means for identifying the suspected return-oriented programming exploit in response to determining that the in-memory distance has the predefined relationship with the threshold distance.

Example 78 includes the subject matter of any of Examples 70-77, and wherein the means for analyzing the trace data using the heuristic algorithm to identify the suspected return-oriented programming exploit further comprises means for determining whether the first target instruction pointer packet is preceded by a flow update packet in the trace data; wherein the means for identifying the suspected return-oriented programming exploit further comprises means for identifying the suspected return-oriented programming exploit in response to determining that the first target instruction pointer packet is not preceded by a flow update packet in the trace data.

Example 79 includes the subject matter of any of Examples 70-78, and, wherein the means for determining the cost value in response to identifying the suspected control flow exploit comprises means for calculating the cost value as a function of a gadget length of the suspected control flow exploit.

Example 80 includes the subject matter of any of Examples 70-79, and wherein the means for calculating the cost value comprises means for assigning a higher cost value to a shorter gadget length.

Example 81 includes the subject matter of any of Examples 70-80, and wherein the means for determining the cost value in response to identifying the suspected control flow exploit comprises (i) means for subtracting the cost value from a total cost budget and (ii) means for determining whether the total cost budget has been exceeded; and the means for handling the suspected control flow exploit based on the cost value comprises means for handling the suspected control flow exploit in response to determining that the total cost budget has been exceeded.

Example 82 includes the subject matter of any of Examples 70-81, and further including means for identifying a non-suspicious instruction based on the trace data; and means for resetting the total cost budget in response to identifying the non-suspicious instruction.

Example 83 includes the subject matter of any of Examples 70-82, and wherein the means for identifying the non-suspicious construction comprises means for identifying a taken/not-taken packet in the trace data.

Example 84 includes the subject matter of any of Examples 70-83, and wherein the means for analyzing the trace data to identify the suspected control flow exploit comprises means for updating a shadow stack based on the trace data; and means for analyzing the shadow stack using a heuristic algorithm to identify a suspected return-oriented programming exploit.

Example 85 includes the subject matter of any of Examples 70-84, and wherein the means for generating the trace data indicative of the control flow of the process of the computing device comprises means for outputting a target instruction pointer packet including a next linear instruction pointer in response to executing a direct call instruction.

Example 86 includes the subject matter of any of Examples 70-85, and wherein the means for generating the trace data indicative of the control flow of the process of the computing device further comprises means for outputting a packet including a current stack pointer value in response to executing a call instruction or a return instruction.

Example 87 includes the subject matter of any of Examples 70-86, and wherein the means for generating the trace data indicative of the control flow of the process of the computing device further comprises means for determining whether a new stack page is being accessed; and the means for outputting the packet including the current stack pointer value further comprises means for outputting the packet including the current stack pointer value in response to determining that the new stack page is being accessed.

Example 88 includes the subject matter of any of Examples 70-87, and wherein the means for analyzing the trace data to identify the suspected control flow exploit comprises means for identifying a first target instruction pointer packet in the trace data, wherein the first target instruction pointer packet is associated with a destination address; means for determining whether the destination address is a predefined legitimate branch target; and means for identifying a suspected jump-oriented programming exploit in response to determining that the destination address is not a predefined legitimate branch target.

Example 89 includes a computing device for real-time exploit mitigation, the computing device comprising means for generating, by a processor trace module of a processor of a computing device, trace data indicative of control flow of a process of the computing device; means for detecting, by the processor trace module, a suspected control flow exploit using the trace data; means for invoking, by the processor trace module, a suspected control flow exploit handler in response to detecting the suspected control flow exploit; means for determining whether a current shadow stack is valid in response to invoking the mispredicted return handler; and means for handling the suspected control flow exploit in response to determining that the current shadow stack is not valid.

Example 90 includes the subject matter of Example 89, and wherein the means for detecting the suspected control flow exploit comprises means for detecting a mispredicted return instruction using the trace data; and the means for invoking the suspected control flow exploit handler comprises means for invoking a mispredicted return handler in response to detecting the mispredicted return instruction.

Example 91 includes the subject matter of any of Examples 89 and 90, and wherein the means for invoking the mispredicted return handler comprises means for invoking the mispredicted return handler in a process space of the process of the computing device.

Example 92 includes the subject matter of any of Examples 89-91, and wherein the means for invoking the mispredicted return handler further comprises means for providing a memory address associated with the trace data to the process.

Example 93 includes the subject matter of any of Examples 89-92, and wherein the means for detecting the suspected control flow exploit comprises means for analyzing the trace data using a heuristic algorithm to identify a suspected return-oriented programming exploit.

Example 94 includes the subject matter of any of Examples 89-93, and further including means for updating the current shadow stack based on the trace data in response to determining that the current shadow stack is valid; means for computing a message authentication code based on the current shadow stack in response to updating the current shadow stack; means for encoding the message authentication code using a handler key, wherein the handler key is located in a protected memory region; and means for outputting the encoded message authentication code to the trace data.

Example 95 includes the subject matter of any of Examples 89-94, and wherein the means for outputting the encoded message authentication code comprises means for executing a processor instruction to write the encoded message authentication code to the trace data.

Example 96 includes the subject matter of any of Examples 89-95, and wherein the means for outputting the encoded message authentication code comprises means for executing one or more branch instructions based on the encoded message authentication code to output coded data to the trace data.

Example 97 includes the subject matter of any of Examples 89-96, and wherein the means for determining whether the current shadow stack is valid comprises means for extracting an encoded message authentication code from the trace data; means for computing a second message authentication code based on the current shadow stack; means for encoding the second message authentication code to generate an encoded second message authentication code using a handler key, wherein the handler key is located in a protected memory region; and means for comparing the encoded message authentication code to the encoded second message authentication code.

Example 98 includes the subject matter of any of Examples 89-97, and wherein the means for encoding the second message authentication code comprises means for recovering the handler key from an immediate value stored in execute-only memory.

Example 99 includes the subject matter of any of Examples 89-98, and wherein the means for extracting the encoded message authentication code from the trace data comprises means for identifying a memory address associated with the trace data, wherein the memory address is supplied by the processor trace module of the processor; and means for searching in the trace data from the memory address associated with the trace data for the encoded message authentication code.

Example 100 includes the subject matter of any of Examples 89-99, and further including means for resuming the process of the computing device in response to determining that the current shadow stack is valid.

Example 101 includes the subject matter of any of Examples 89-100, and wherein the means for generating the trace data indicative of the control flow of the process of the computing device comprises means for outputting a target instruction pointer packet including a next linear instruction pointer in response to executing a direct call instruction.

Example 102 includes the subject matter of any of Examples 89-101, and wherein the means for generating the trace data indicative of the control flow of the process of the computing device further comprises means for determining whether a current stack pointer value is located in a different memory page from a previous stack pointer value; and means for outputting a packet including the current stack pointer value in response to executing a call instruction or a return instruction and determining that the current stack pointer value is located in a different memory page from the previous stack pointer value.

The invention claimed is:

1. A computing device for exploit mitigation, the computing device comprising:
a hardware processor comprising a processor trace module to generate trace data indicative of control flow of a process of the computing device during an execution of the process, wherein the control flow comprises an order of instructions executed by the processor;
an exploit detector module to:
(i) detect preemption of the process during the execution of the process;
(ii) in response to detection of the preemption of the process, analyze the trace data using a heuristic algorithm to identify a suspected control flow exploit that is a suspected return-oriented programming exploit, wherein to analyze the trace data using the heuristic algorithm to identify the suspected return-oriented programming exploit comprises to:
identify a first target instruction pointer packet in the trace data, wherein the first target instruction pointer packet is associated with a destination address;
find a return instruction in memory at an address that follows the destination address of the first target instruction packet; and
identify the suspected return-oriented programming exploit in response to finding the return instruction in memory; and
(iii) determine a cost value in response to identification of the suspected control flow exploit, wherein the cost value is indicative of a likelihood that the suspected control flow exploit is an actual control flow exploit, wherein to determine the cost value comprises to:
(a) subtract the cost value from a total cost budget, wherein the total cost budget is associated with the process; and
(b) determine whether the total cost budget has been exceeded; and
a security response module to handle the suspected control flow exploit in response to a determination that the total cost budget has been exceeded.

2. The computing device of claim 1, wherein to analyze the trace data using the heuristic algorithm to identify the suspected return-oriented programming exploit further comprises to:
identify a pair of successive target instruction pointer packets in the trace data, wherein the pair of successive target instruction pointer packets includes the first target instruction pointer packet;
wherein to identify the suspected return-oriented programming exploit further comprises to identify the suspected return-oriented programming exploit in response to identification of the pair of successive target instruction pointer packets.

3. The computing device of claim 1, wherein to analyze the trace data using the heuristic algorithm to identify the suspected return-oriented programming exploit further comprises to:
determine whether the first target instruction pointer packet is preceded by a flow update packet in the trace data;
wherein to identify the suspected return-oriented programming exploit further comprises to identify the suspected return-oriented programming exploit in response to a determination that the first target instruction pointer packet is not preceded by a flow update packet in the trace data.

4. The computing device of claim 1, wherein:
the exploit detector module is further to (i) identify a non-suspicious instruction based on the trace data, wherein to identify the non-suspicious construction comprises to identify a taken/not-taken packet in the trace data; and (ii) reset the total cost budget in response to identification of the non-suspicious instruction.

5. The computing device of claim 1, wherein:
to generate the trace data indicative of the control flow of the process of the computing device comprises to output a target instruction pointer packet including a next linear instruction pointer in response to execution of a direct call instruction; and
to analyze the trace data to identify the suspected control flow exploit further comprises to (i) update a shadow stack based on the trace data and (ii) analyze the shadow stack using a heuristic algorithm to identify a suspected return-oriented programming exploit.

6. The computing device of claim 5, wherein to generate the trace data indicative of the control flow of the process of the computing device further comprises to:
output a packet including a current stack pointer value in response to execution of a call instruction or a return instruction.

7. The computing device of claim 1, wherein to analyze the trace data to identify the suspected control flow exploit further comprises to:
identify a first target instruction pointer packet in the trace data, wherein the first target instruction pointer packet is associated with a destination address;
determine whether the destination address is a predefined legitimate branch target; and
identify a suspected jump-oriented programming exploit in response to a determination that the destination address is not a predefined legitimate branch target.

8. A computing device for real-time exploit mitigation, the computing device comprising:
a hardware processor comprising a processor trace module to:
generate trace data indicative of control flow of a process of the computing device during an execution of the process, wherein the control flow comprises an order of instructions executed by the processor;
detect a suspected control flow exploit using a heuristic algorithm to identify a suspected return-oriented programming exploit that is a mispredicted return instruction using the trace data; and
in response to detection of the suspected control flow exploit, invoke a suspected control flow exploit handler wherein the suspected control flow exploit handler comprises a mispredicted return handler;
an exploit detector module to in response to invocation of the suspected control flow exploit handler, determine whether a current shadow stack is valid, and update the current shadow stack based on the trace data in response to a determination that the current shadow stack is valid; and
a security response module to handle the suspected control flow exploit in response to a determination that the current shadow stack is not valid.

9. The computing device of claim 8, wherein the exploit detector module is further to:
compute a message authentication code based on the current shadow stack in response to updating of the current shadow stack;
encode the message authentication code using a handler key, wherein the handler key is located in a protected memory region; and
output the encoded message authentication code to the trace data.

10. The computing device of claim 9, wherein to output the encoded message authentication code comprises to execute a processor instruction to write the encoded message authentication code to the trace data.

11. The computing device of claim 9, wherein to output the encoded message authentication code comprises to execute one or more branch instructions based on the encoded message authentication code to output coded data to the trace data.

12. The computing device of claim 8, wherein to determine whether the current shadow stack is valid comprises to:
extract an encoded first message authentication code from the trace data, wherein the encoded first message authentication code was previously output to the trace data;
compute a second message authentication code based on the current shadow stack;
encode the second message authentication code to generate an encoded second message authentication code using a handler key, wherein the handler key is located in a protected memory region; and
compare the encoded first message authentication code to the encoded second message authentication code.

13. The computing device of claim 12, wherein to encode the second message authentication code comprises to recover the handler key from an immediate value stored in execute-only memory.

14. One or more non-transitory, computer-readable storage media comprising a plurality of instructions that in response to being executed cause a computing device to:
generate, by a processor trace module of a processor of the computing device, trace data indicative of control flow of a process of the computing device during an execution of the process, wherein the control flow comprises an order of instructions executed by the processor;
detect preemption of the process during the execution of the process;
analyze the trace data to identify a suspected control flow exploit in response to detecting the preemption of the process, wherein to analyze the trace data to identify the suspected control flow exploit comprises to analyze the trace data using a heuristic algorithm to identify a suspected return-oriented programming exploit, wherein to analyze the trace data using the heuristic algorithm to identify the suspected return-oriented programming exploit comprises to:
identify a first target instruction pointer packet in the trace data, wherein the first target instruction pointer packet is associated with a destination address;
find a return instruction in memory at an address that follows the destination address of the first target instruction pointer packet; and
identify the suspected return-oriented programming exploit in response to finding the return instruction in memory;
determine a cost value in response to identifying the suspected control flow exploit, wherein the cost value is indicative of a likelihood that the suspected control flow exploit is an actual control flow exploit, wherein to determine the cost value comprises to:
subtract the cost value from a total cost budget, wherein the total cost budget is associated with the process;
determine whether the total cost budget has been exceeded; and handle the suspected control flow exploit in response to determining that the total cost budget has been exceeded.

15. The one or more non-transitory, computer-readable storage media of claim 14, wherein:
to generate the trace data indicative of the control flow of the process of the computing device comprises to output a target instruction pointer packet including a next linear instruction pointer in response to executing a direct call instruction; and
to analyze the trace data to identify the suspected control flow exploit further comprises to (i) update a shadow stack based on the trace data and (ii) analyze the shadow stack using a heuristic algorithm to identify a suspected return-oriented programming exploit.

16. The one or more non-transitory, computer-readable storage media of claim 14, wherein to analyze the trace data to identify the suspected control flow exploit further comprises to:
identify a first target instruction pointer packet in the trace data, wherein the first target instruction pointer packet is associated with a destination address;
determine whether the destination address is a predefined legitimate branch target; and
identify a suspected jump-oriented programming exploit in response to determining that the destination address is not a predefined legitimate branch target.

17. One or more non-transitory, computer-readable storage media comprising a plurality of instructions that in response to being executed cause a computing device to:
generate, by a processor trace module of a processor of the computing device, trace data indicative of control flow of a process of the computing device during an execution of the process, wherein the control flow comprises an order of instructions executed by the processor;
detect, by the processor trace module, a suspected control flow exploit using a heuristic algorithm to identify a suspected return-oriented programming exploit that is a mispredicted return instruction using the trace data;
invoke, by the processor trace module, a suspected control flow exploit handler in response to detecting the suspected control flow exploit, wherein the suspected control flow exploit handler comprises a mispredicted return handler;
determine whether a current shadow stack is valid in response to invoking the mispredicted return handler;
update the current shadow stack based on the trace data in response to determining that the current shadow stack is valid; and
handle the suspected control flow exploit in response to determining that the current shadow stack is not valid.

18. The one or more non-transitory, computer-readable storage media of claim 17, further comprising a plurality of instructions that in response to being executed cause the computing device to:
compute a message authentication code based on the current shadow stack in response to updating the current shadow stack;
encode the message authentication code using a handler key, wherein the handler key is located in a protected memory region; and
output the encoded message authentication code to the trace data.

19. The one or more non-transitory, computer-readable storage media of claim 17, wherein to determine whether the current shadow stack is valid comprises to:
extract an encoded first message authentication code from the trace data, wherein the encoded first message authentication code was previously output to the trace data;
compute a second message authentication code based on the current shadow stack;
encode the second message authentication code to generate an encoded second message authentication code using a handler key, wherein the handler key is located in a protected memory region; and
compare the encoded first message authentication code to the encoded second message authentication code.

* * * * *